United States Patent

[11] 3,566,915

[72] Inventor Willis D. Griffin
 Chino, Calif.
[21] Appl. No. 821,568
[22] Filed May 5, 1969
[45] Patented Mar. 2, 1971
[73] Assignee North American Rockwell Corporation

[54] HYDRAULIC SYSTEM USING CONCENTRIC LINES
 2 Claims, 1 Drawing Fig.

[52] U.S. Cl. .................................................. 137/561,
 138/114, 285/133
[51] Int. Cl. .................................................. F16l 39/00
[50] Field of Search ........................................ 137/561,
 564.5; 138/114; 285/133

[56] References Cited
UNITED STATES PATENTS

| | | | |
|---|---|---|---|
| 2,475,635 | 7/1949 | Parsons........................ | 285/133 |
| 2,592,574 | 4/1952 | Kaiser........................ | 285/133 |
| 2,838,074 | 6/1958 | Lauck........................ | 138/114X |
| 3,066,803 | 12/1962 | Seils, Jr. ........................ | 285/133X |

*Primary Examiner*—William R. Cline
*Attorneys*—William R. Lane, L. Lee Humphries and Robert G. Rogers

ABSTRACT: The pressure hose of a hydraulic system is enclosed within the return hose and connected by a hydraulic fitting to the mechanical system being operated by the hydraulic fluid passing through the hoses.

PATENTED MAR 2 1971
3,566,915
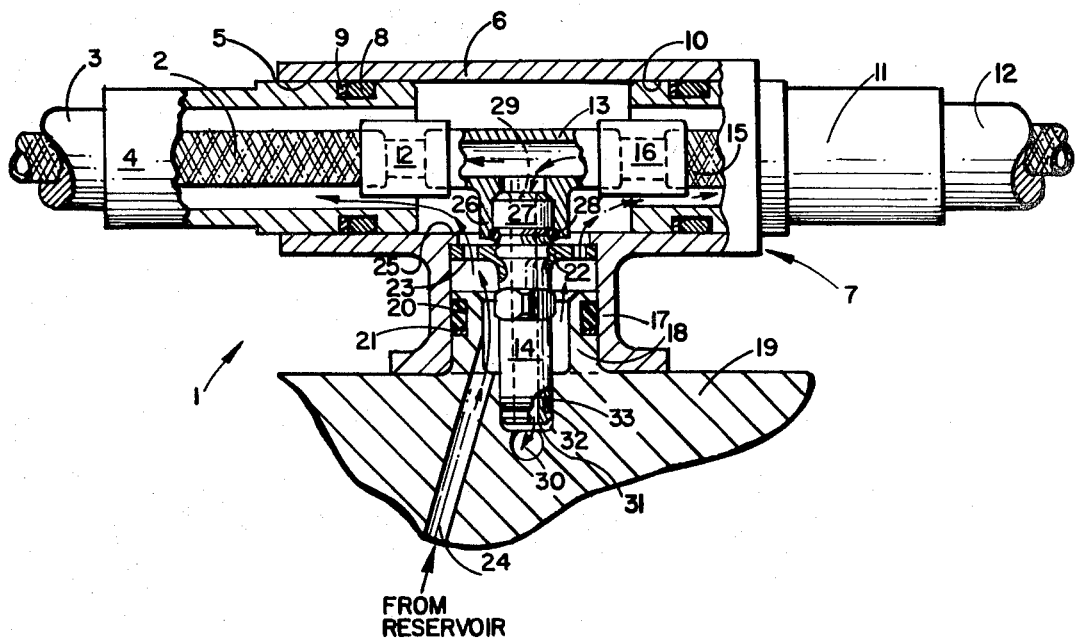
FROM RESERVOIR
INVENTOR.
WILLIS D. GRIFFIN
BY Robert G Rogers
ATTORNEY

HYDRAULIC SYSTEM USING CONCENTRIC LINES

BACKGROUND OF THE INVENTION

1. Field of the Invention

The invention relates to a hydraulic system and more particularly to such a system in which the hoses are concentric and are connected to mechanical equipment by a hydraulic fitting.

2. Description of Prior Art

Existing hydraulic systems require space and maintenance for two flex lines, or hoses, manifolds and related plumbing. In addition, since hydraulic fluid leakage from the pressure line may occur, the existing systems are not as safe as desired. Reliability is also reduced because if one of the lines develops a leak, the system operation must be interrupted until repairs are made.

Shields have been introduced to protect operators from radiation and heat, often emitted from the hoses. The shields also protect an operator from the fluid in the event of a rupture. However, the weight and volume of a shield increases with the number of hoses being shielded. As a result, additional shields are required for systems having more than one hydraulic flex line.

Similarly, support brackets and hydraulic fixtures are required for each hose. If the number of hoses can be reduced, the number of brackets and maintenance required to attach the hoses could be substantially reduced.

The present system overcomes the disadvantages of existing hydraulic flex line systems by providing concentric hoses and a hydraulic fitting as described herein.

SUMMARY OF THE INVENTION

Briefly, the invention comprises a pressure hose which is enclosed within a return hose to implement a concentric hydraulic flex line system. The hoses are connected to the mechanical system using the hydraulic fluid by a fitting which has one channel for the fluid under pressure and a second channel formed about the first for the returning fluid.

As a result of having the pressure line enclosed within the return line, fluid leaks from the pressure line flow into the return line without causing an interruption in the system operation. In addition, the operator is protected from a rupture or break in the pressure line since the fluid would be contained within the return line.

The concentric line also reduces the size and volume of the protecting shield, the maintenance installation and repair time required by an operator to work with one hose line assembly instead of two. Supporting brackets, hydraulic fittings, and attachment points between the fittings and the mechanical system are also reduced. In the present invention, instead of having one attachment point and hydraulic fittings for the pressure line and an additional attachment point and hydraulic fitting for the return line, one attachment and one hydraulic fitting is used.

Therefore, it is an object of this invention to provide a hydraulic system using concentric lines which are interconnected to a mechanical system at one general location by means of a single hydraulic fitting.

It is another object of this invention to provide an improved hydraulic system using concentric lines.

It is another object of this invention to provide a hydraulic system using concentric lines which is relatively more reliable and safer than systems not using concentric lines.

A still further object of this invention is to provide a more reliable hydraulic system by enclosing the pressure line within the return line of a hydraulic flex line system.

A still further object of this invention is to connect concentrically disposed hoses of a hydraulic flex line system to ta mechanical system using the fluid passing through the hoses by means of a single hydraulic fitting.

These and other objects of the invention will become more apparent when taken in connection with the description of the invention, a brief description of which follows:

BRIEF DESCRIPTION OF DRAWINGS

The FIGURE is a partially sectioned side view of the hydraulic system showing the pressure hose concentrically disposed within the return hose with both hoses being connected to a hydraulic system by means of a single hydraulic fitting.

DESCRIPTION OF PREFERRED EMBODIMENT

The FIGURE illustrates a preferred embodiment of a hydraulic system 1 having pressure line 2 concentrically disposed within return line 3. The lines or hoses may be manufactured separately and assembled as shown to form the concentric combination. Teflon or other suitable materials may be used to satisfy the pressure, flexibility, and other requirements of a particular application.

The return line 3 is connected within metal fitting 4 which may be crimped to prevent the line from becoming disconnected. The metal fitting 4 inserts into opening 5 of manifold 6 comprising part of hydraulic fitting 7 of the system. O-ring 8 and backup ring 9 prevent the fluid in the return line 3 from leaking.

Manifold 6 also includes opening 10 to accommodate metal fitting 11 of return line 12. It is pointed out that in other embodiments, only one-half of the hydraulic fittings shown may be required. The particular embodiment illustrated may be used where several mechanical systems are being driven by the same hydraulic flex line system.

The end of pressure line 2 is also crimped inside a metal fitting 12. The metal fitting 12 is crimped onto T-joint 13 which is connected to the hollow extension plug 14. The pressure line 15, also crimped inside metal fitting 16 is connected to the other part of the T-joint 13.

The stem portion 17 of the manifold 6 encloses extension plug 14 and also fits around the protruding rim 18 at the interface of the mechanical system (fluid utilization device) represented generally by numeral 19. O-ring seal 20 and backup ring 21 prevent fluid leakage between the surfaces shown.

The hollow plug 14 has a metal flange 22 which includes openings represented generally by numeral 23 about its periphery. The openings permit the passage of fluid from the return port 24 of the mechanical system to pass into the return line 3. The top surface of the flange 22 abuts against rim 25 of the manifold in order to meet the assembly requirements of the system. The stem portion 26 of T-joint 13 fits about the head 27 of the hollow plug. O-ring 28 is used to prevent leakage from the T-joing 13.

Hollow plug 14 includes a centrally disposed channel 29 which permits fluid under pressure to pass from pressure line 2 to pressure port 30 of the mechanical system. The pressure port, for example, may be connected to a rod which is actuated by the pressurized fluid. The other end 31 of plug 14 is provided with O-ring 32 and backup ring 33 to prevent leakage from occurring at that connection.

In a particular embodiment, the manifold, T-joint 13, hollow plug 14, protruding rim 18, are made of a metal such as steel. However, for other embodiments, other materials may be used if the materials will satisfy the pressure and use requirements of a particular application.

Prior to an operation, the system must be assembled. Ordinarily, the pressure and return lines are assembled by the manufacturer. As a result, it is only necessary to connect the T-joint 13 to the metal fittings of the pressure lines. Subsequently, the assembled T-joint and hoses are pushed inside manifold 6. For the embodiment shown in the FIGURE, the assembly is pushed completely through the manifold to permit the metal fitting of the other pressure hose to be connected to the other opening of the T-joint. After that connection has been made, the assembly is pushed inside the manifold until the T-joint is approximately centrally located within the opening of the stem of the manifold. At that time, the hollow plug 14 is inserted inside the stem portion 26 of T-joint 13 as shown. Subsequently, the manifold and hollow plug are pressed down into contact about rim 18 and into the opening provided over port 30 of machine 19.

In operation, pressurized fluid passes from the pressure lines through central opening 29 of the hollow plug into the pressure port. After the machine has been operated, for example, a rod pushed a predetermined distance, the fluid passes into a reservoir which is connected to return port 24. Fluid in the return port passes inside the opening provided by rim 18 through the centrally disposed openings 23 and into return hose 3. Thereafter, it is conducted to a hydraulic pump where it is repressurized and pumped into pressure line 2.

I claim:

1. A system for coupling hydraulic lines to and from a fluid utilization device, said system comprising:

coaxial fluid lines arranged one inside of another with the inside fluid line conducting fluid having a relatively higher pressure than the fluid in the outer fluid line;

a hydraulic fitting including an outer manifold section having an inner diameter for mating with the outer diameter of the outer line, and a hydraulic joint inside said fitting for coupling with the inner line; and said hydraulic fitting including a stem section connecting said hydraulic fitting to a fluid utilization device, said stem section enclosing an extension plug having a central channel and an orifice for conducting fluid from said inner fluid line to said fluid utilization device, said extension plug having a flange about its circumference including openings for permitting fluid to flow from the reservoir of said fluid utilization device into said outer fluid line, said flange mating inside said stem section for preventing said fluid from flowing into said outer fluid line except through the openings of said flange.

2. The hydraulic system recited in claim 1 wherein said hydraulic fitting is a T-fitting for accommodating additional coaxial fluid lines for conducting fluid to and from a plurality of fluid utilization devices.